Feb. 2, 1954     H. P. KUPIEC     2,667,893
RELIEF VALVE

Filed Feb. 3, 1950     2 Sheets-Sheet 1

INVENTOR.
HARRY P. KUPIEC
BY
Clark & Ott
ATTORNEYS

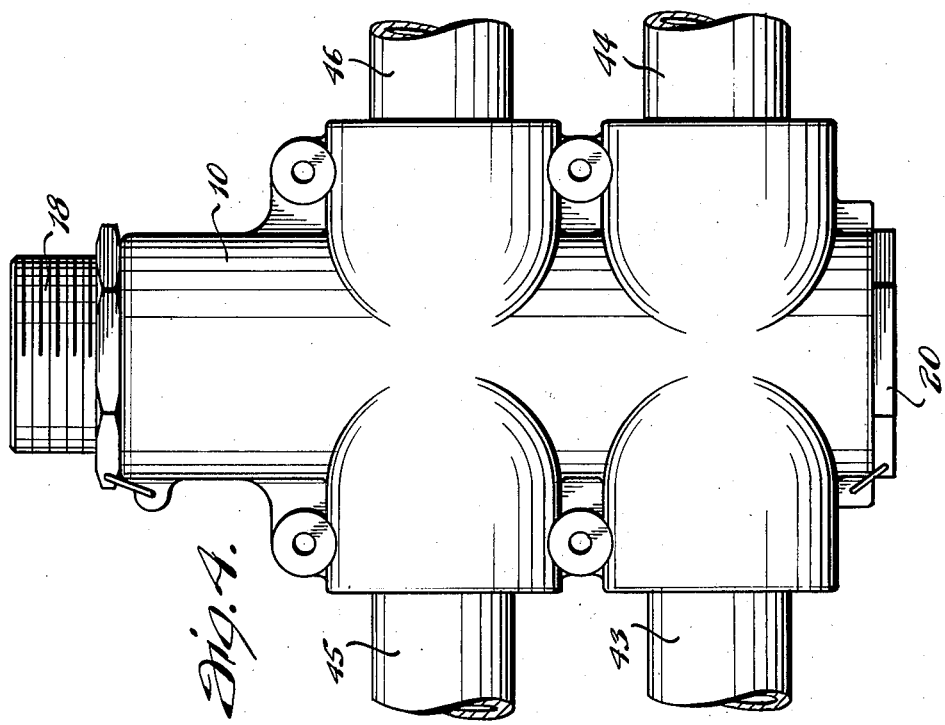
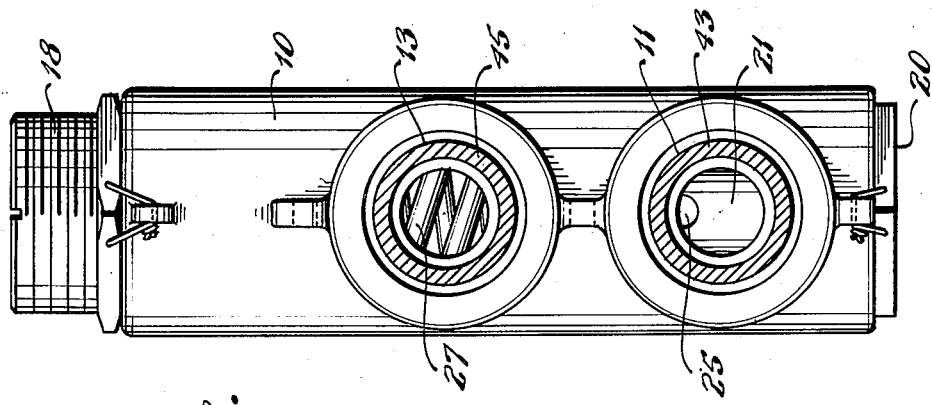

Patented Feb. 2, 1954

2,667,893

UNITED STATES PATENT OFFICE 2,667,893

RELIEF VALVE

Harry P. Kupiec, Paramus, N. J., assignor to Air Associates, Incorporated, Teterboro, N. J., a corporation of New Jersey Application February 3, 1950, Serial No. 142,285

4 Claims. (Cl. 137—494)

This invention relates to a relief valve which is constructed and arranged to operate at high and low temperatures.

The invention has particular reference to a relief valve of the poppet type which is provided with a piston mounted for reciprocatory movement in a dash-pot for cushioning or dampening the movement of the poppet. It has been found that piston and dash-pot constructions of this type having sufficient clearance to permit of the flow of fluid between the piston and wall of the dash-pot at high temperatures do not operate freely at low temperatures and at extremely low temperatures the movement of the piston is too sluggish to permit of proper performance due to the increase of viscosity of the fluid. In order to overcome this objection the present invention comprehends a relief valve of said character in which the piston is provided with a check valve which functions to permit of the flow of fluid in one direction through the piston with the movement of the poppet to open relation to thereby provide a construction in which the piston operates freely at high and low temperatures.

Still another object of the invention is to provide a relief valve in which the full flow pressure is not more than 110% of the cracking pressure or predetermined pressure at which the poppet opens, throughout a temperature range of +160° F. to —65° F. and in which the re-seat pressure is not lower than 90% of the cracking pressure throughout said temperature range.

Still another object of the invention is to provide a relief valve in which one end of the dash-pot forms the valve seat and the other end thereof is formed as a nut which is threadedly secured in the valve casing with the piston mounted for reciprocatory movement in the dash-pot and the poppet adapted to engage the valve seat to close the relief outlet.

With the foregoing and other objects in view, reference is now made to the following specification and accompanying drawings in which the preferred embodiment of the invention is illustrated.

In the drawings:

Fig. 3 is an end view of the relief valve.

Fig. 4 is a side view thereof.

Figure 1:
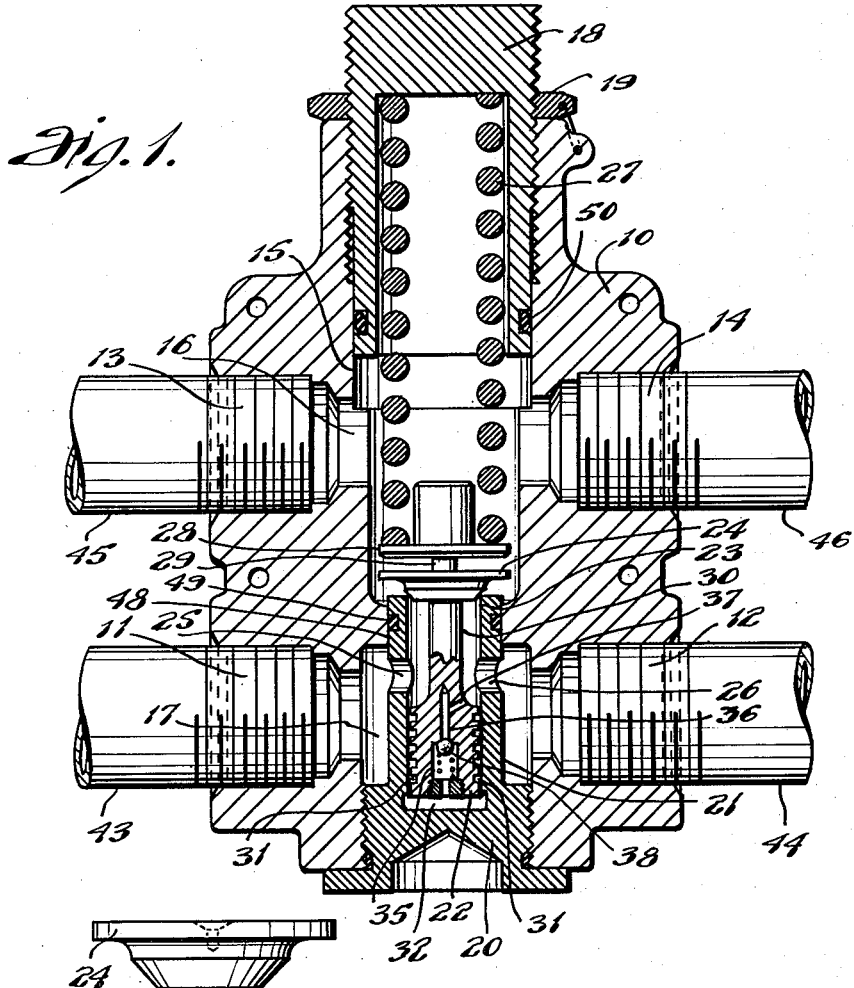
Fig. 1 is a vertical sectional view through a relief valve constructed in accordance with the invention.
Figure 2:
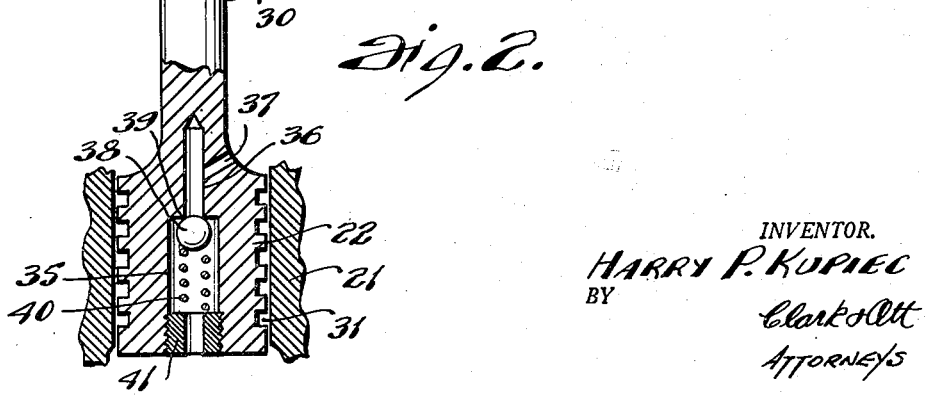
Fig. 2 is a view in elevation of a combined piston and poppet.

Referring to the drawings by characters of reference, the relief valve includes a casing 10 having internally threaded aligned pressure ports 11 and 12 and internally threaded aligned return ports 13 and 14. The relief valve is adapted to be connected in an hydraulic supply system with the ports 11 and 12 interposed in the pressure supply line and the return ports 13 and 14 interposed in the return line to the reservoir.

The casing 10 is provided with a bore 15 which opens through the opposite ends thereof and intersects a passageway 16 between the return ports 13 and 14 and a passageway 17 between the pressure ports 11 and 12. The bore 15 is closed at one end by an externally threaded cap 18 which is adjustable in the bore and is adapted to be engaged by a locking nut 19 for locking the cap in adjusted position. The opposite end of the bore 15 is closed by a nut 20 which is threadedly secured therein and is formed with a hollow cylindrical extension 21 forming a dash-pot for a piston 22 mounted for reciprocatory movement therein and with the inner end 23 of said extension forming a valve seat for a poppet 24 formed integrally with the piston 22.

The cylindrical extension 21 is formed with aligned apertures 25 and 26 through the side walls thereof to permit of the flow of fluid from the pressure port 11 through the passageway 17 and the discharge thereof through the pressure port 12 when the poppet 24 is in closed relation on the seat 23 and to permit of the discharge of fluid from within the extension 21 through the relief outlet defined by the valve seat 23 and thence into the return line through either of the return ports 13 and 14.

The poppet 24 is normally maintained in seated or closed relation on the valve seat 23 by means of a coil spring 27 which is interposed between the recessed upper end of the cap 18 and a saddle 28 having a reduced end 29 tensioned against the outer end of the poppet 24 by said spring. The cap 18 is adapted to be adjusted in the bore 15 in order to provide the required tension of the spring 27 against the poppet 24 so that the poppet 24 will be moved to open relation in accordance with a predetermined pressure in the pressure line of the system connected with the pressure ports 11 and 12. The piston 22 is connected with the poppet 24 by a reduced shank 30 to provide an annular recess surrounding the shank for the flow of fluid through the extension 21. The piston is formed with a plurality of parallel grooves 31 in the periphery thereof so as to reduce the surface contact of the piston with the inner peripheral wall of the dash-pot and to produce a series of pressure drops in the fluid flowing between the piston and the inner periphery of the dash-pot which increases the restriction to the flow of fluid therebetween. The clearance between the piston and the inner periphery of the wall of the dash-pot is within the tolerance of .0005″ and .0015″ which is sufficient at high temperatures to permit of the flow of fluid between the piston and inner periphery of the dash-pot and into the space 32 between the lower end of the piston and the bottom of the dash-pot when the poppet is moved to open and closed relation.

This restriction to the flow of fluid permits proper functioning of the poppet at high temperatures whereby the full flow pressure of the fluid when the poppet is in open relation is not more than 110% of the cracking pressure of the fluid or the predetermined pressure at which the poppet opens. As the temperature lowers, the viscosity of the fluid in the system increases so that at extremely low temperatures the flow of fluid between the piston and the periphery of the dash-pot is retarded whereby the poppet is too sluggish in its movement to permit of proper functioning. In order to overcome this condition at low temperatures the piston is provided with a bore 35 opening through the lower end thereof and having a reduced inner end 36 with an outlet duct 37 opening through the side of the piston. A ball valve element 38 is disposed within the bore 35 for movement toward and away from a valve seat 39 located at the juncture of the reduced inner end 36 with the lower portion of the bore.

The ball valve element 38 is engaged by a coiled expansion spring 40 which is interposed between the ball valve element and the inner end of a centrally apertured bushing 41 threadedly secured in the lower end of the bore. The flow of fluid through the bore 35 and into the space 32 permits proper functioning of the poppet at low temperatures whereby the full flow pressure of the fluid in the system when the poppet is in open relation is not more than 110% of the cracking pressure of the fluid or the predetermined pressure at which the poppet opens.

The flow of fluid between the piston and the inner periphery of the dash-pot at high and low temperatures is sufficient to permit the piston to move downwardly in the dash-pot and the poppet to move to closed relation as the pressure in the system is reduced whereby the re-seat pressure of the fluid in the system is not lower than 90% of the cracking pressure of the fluid in the system or the predetermined pressure at which the poppet opens. While the bore 35 in the piston is necessary for the flow of the fluid into the space 32 at low temperatures on the opening movement of the poppet, it will be understood that the ball valve element 38 closes on the movement of the poppet to closed relation so as to close off the flow of fluid through the bore 35. The fluid in the space 32 will escape between the piston and the inner periphery of the dash-pot on closing movement of the poppet since the viscosity of the fluid is reduced by the rise in temperature thereof due to the flow of the fluid through the outlet passage 37, past the ball valve element 39 and through the bore 35.

Constructed in this manner the movement of the piston in the dash-pot is retarded to cushion the movement of the poppet toward open and closed relation so as to dampen out pulsations in the system throughout a temperature range of +160° F. to −65° F. In the embodiment illustrated, the relief valve is connected to piping 43 and 44 threadedly secured in the ports 11 and 12 and which piping forms part of the fluid pressure line of an hydraulic supply system, while piping 45 and 46 is threadedly secured in the return ports 13 and 14 which piping forms part of the fluid return line of the system, the valve being adapted to be disposed in a system in which the pressure range is from 1,000 to 2,300 pounds per square inch and in which the capacity is 16 gallons per minute. It will be understood that the passageway 17 is relatively larger in cross-sectional area than the cylindrical extension 21 so as to provide an annular recess surrounding the said extension. This provides means by which the fluid may flow around said extension in passing through the valve.

The inner end of the cylindrical extension 21 of the nut 20 snugly fits the reduced portion 48 of the bore 15 of the valve and the extension is provided with a packing ring 49 to prevent the flow of fluid between the extension and the inner periphery of the bore portion 48. The cap 18 is also provided with a packing ring 50 so as to prevent the flow of fluid between the cap and the inner periphery of the bore 15.

What is claimed is:

1. In a relief valve, a casing having a valve chamber and inlet and outlet ports, a tubular member arranged in fixed position in said chamber and having a closed lower end and a peripheral upper edge defining a valve seat and relief port disposed between said inlet and outlet ports, said tubular member having an opening in the side wall thereof for the flow of fluid from the inlet port into said tubular member and the discharge thereof through the relief port, a combined piston and poppet arranged with the piston disposed for reciprocatory movement in said tubular member with the lower end thereof normally spaced from the closed lower end of the tubular member to provide a dash-pot construction and with the poppet movable toward and away from said valve seat for regulating the flow of the fluid through said relief port, means tensioning said piston and poppet for normally maintaining the poppet in engagement with the valve seat, said piston having a passageway opening through the lower end thereof and at its upper end opening into the interior of said tubular member, and a check valve normally closing said passageway and adapted to open on increase of pressure in the inlet port to permit of the flow of fluid through said passageway and into the space between the lower end of the piston and the closed lower end of the tubular member for effecting movement of the poppet to open relation.

2. In a relief valve, a casing having a valve chamber and inlet and outlet ports, a tubular member arranged in fixed position in said chamber and having a closed lower end and a peripheral upper edge defining a valve seat and relief port disposed between said inlet and outlet ports, said tubular member having an opening in the side wall thereof for the flow of fluid from the inlet port into said tubular member and the discharge thereof through the relief port, a combined piston and poppet arranged with the piston disposed for reciprocatory movement in said tubular member and with the poppet movable toward and away from said valve seat for regulating the flow of the fluid through said relief port, said piston having a series of grooves extending about the periphery thereof to produce a series of pressure drops in the fluid flowing between the piston and the inner periphery of said tubular member to thereby increase the restriction to the flow of the fluid therebetween, means tensioning said piston and poppet for normally maintaining the poppet in engagement with the valve seat, said piston having a passageway opening through the lower end thereof and at its upper end opening into the interior of said tubular member, and a check valve normally closing said passageway and adapted to open on increase of pressure above the check valve to permit of the flow of fluid through said passageway and into the space between the lower end of the piston and the closed lower end of the tubular member for effecting movement of the poppet to open relation.

3. In a relief valve, a casing having a valve chamber formed with a closed lower end and having inlet and outlet ports and a valve seat disposed between said inlet and outlet ports providing a relief port therebetween, a combined piston and poppet arranged with the piston disposed for reciprocatory movement in said chamber and normally spaced from the closed lower end thereof to provide a dash-pot construction, and said poppet being movable toward and away from said valve seat for regulating the flow of the fluid from said relief port, means tensioning said piston and poppet for normally maintaining the poppet in engagement with the valve seat, said piston having a passageway opening through the lower end thereof and at its upper end opening into the interior of said chamber below said valve seat, and a valve normally closing said passageway and adapted to open on increase of pressure above the valve to permit the bypassing of fluid from above the piston and into the space between the lower end of the piston and the closed lower end of the chamber for effecting movement of the poppet to open relation.

4. In a relief valve, a casing having a valve chamber closed at its lower end and inlet and outlet ports and having a valve seat disposed between said inlet and outlet ports providing a relief port therebetween, a combined piston and poppet arranged with the piston disposed for reciprocatory movement in said chamber and with the poppet movable toward and away from said valve seat for regulating the flow of the fluid through said relief port, said piston having a series of grooves extending about the periphery thereof to produce a series of pressure drops in the fluid flowing between the piston and the inner periphery of said casing to thereby increase the restriction to the flow of the fluid therebetween, means tensioning said piston and poppet for normally maintaining the poppet in engagement with the valve seat, said piston having a passageway opening through the lower end thereof and at its upper end opening into the interior of said chamber, and a check valve normally closing said passageway and adapted to open on increase of pressure above the check valve to permit the by-passing of fluid through said passageway and into the chamber at the lower end of said piston for effecting movement of the poppet to open relation.

HARRY P. KUPIEC.

References Cited in the file of this patent

UNITED STATES PATENTS

| Number | Name | Date |
|---|---|---|
| 96,999 | Taylor | Nov. 16, 1869 |
| 108,345 | Goll | Oct. 18, 1870 |
| 2,388,406 | Haberland | Nov. 6, 1945 |
| 2,411,930 | Mattrys | Dec. 3, 1946 |
| 2,416,881 | Osborn | Mar. 4, 1947 |